May 23, 1933.  W. G. HOELSCHER ET AL  1,910,334
LATHE CARRIAGE APRON MECHANISM
Filed April 6, 1931    3 Sheets-Sheet 2

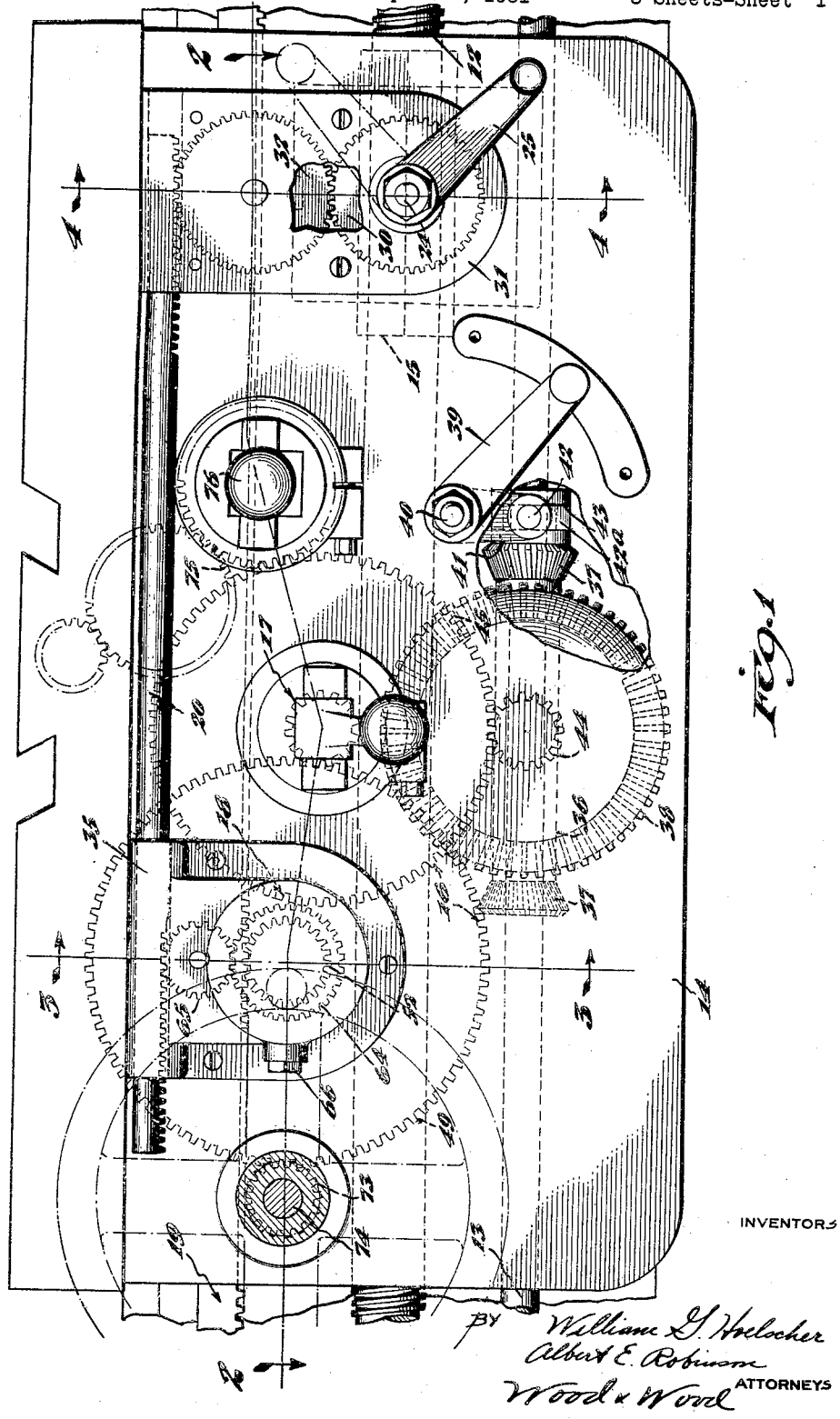

INVENTORS
William G. Hoelscher
Albert E. Robinson
BY Wood & Wood  ATTORNEYS

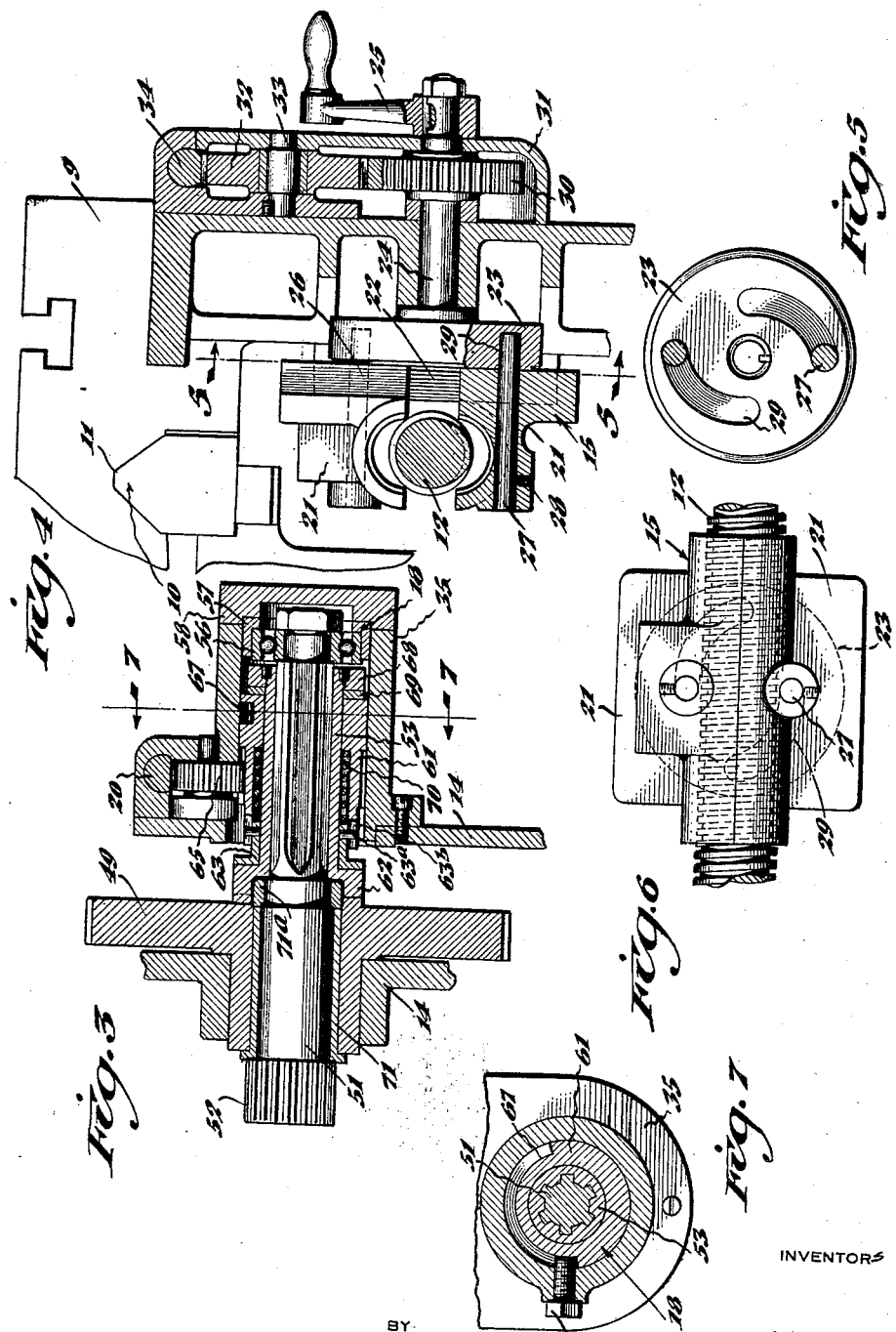

Patented May 23, 1933

1,910,334

UNITED STATES PATENT OFFICE

WILLIAM G. HOELSCHER, OF NORWOOD, AND ALBERT E. ROBINSON, OF CINCINNATI, OHIO, ASSIGNORS TO THE AMERICAN TOOL WORKS COMPANY, OF CINCINNATI, OHIO, A CORPORATION OF OHIO

LATHE CARRIAGE APRON MECHANISM

Application filed April 6, 1931. Serial No. 527,959.

This invention relates to lathes and is particularly directed to improvements in the transmission located within the apron of the carriage for feeding the carriage. The lathe carriage is moved through two drives, selectively applied, one of which is accomplished by means of a driven screw extending through the carriage and adapted to be connected thereto through a nut, and the other of which is accomplished by means of a power shaft also traversing the apron and adapted to move the carriage by means of a train of gears extending therefrom to a feed rack fixed to the body of the lathe. Each of these respective drives or feeding means are inclusive of clutches or power coupling means and the appropriate levers for manually effecting the feeding connection to the carriage.

It is the object of the present invention to provide an interconnected control between the respective transmissions, or their levers, whereby coupling of one drive can not be effected without uncoupling of the other, thereby preventing the occurrence of simultaneous coupling of the two forms of drive to the carriage.

It is another object of this invention to provide that the coupling means can be alternately and arbitrarily operated by a single lever. For the purpose of the intercontrol, an improved type of connecting mechanism is provided which is highly efficient, and which is of the utmost simplicity.

It is another object of this invention to provide improved means for connecting the carriage to the feed screw and an improved form of clutch in combination with the intercontrol for connecting the feed or power shaft to the rack of the lathe.

The screw feed is used in a great many instances where steady and uniform feed is desirable as in thread cutting operations, and for this reason it is highly desirable to have the transmission from the power shaft entirely or substantially at rest when the screw feed is being used assuming the other connections as the reverse lever and the main clutch to be out. In other words, it is preferable to prevent all back rotation of gearing and rotation of the hand wheel at the time of screw feed.

It is, therefore, another object of this invention to provide an intercontrol device of the foregoing nature which is effective for automatically disconnecting the power shaft drive to the rack as close to the rack as possible when the screw feed is being used. In this instance the disconnection occurs in such fashion that the only back rotation, which occurs because of the movement of the rack engaging pinion relative to the rack, is that of the shaft carrying the pinion. The hand wheel, and the remainder of the transmission to the power shaft are at rest. This objective will be readily appreciated when it is observed that it is not expedient mechanically to have the large gears effective for rotating pinions which are not under load. Then too, the hazard of a rotating hand wheel is abolished during the time that the screw feed is taking place.

Other objects and certain advantages will be more fully set forth in the description of the accompanying drawings, forming a part of this specification, in which:

Figure 1 is a side view of a portion of a lathe exteriorly illustrating the lathe apron and the associated parts of the lathe.

Figure 2 is a sectional view taken on line 2—2, Figure 1, illustrating the interior construction of the apron for showing the transmission as well as the intercontrol clutch and operating means for connecting the transmission to the rack.

Figure 3 is a sectional view taken on line 3—3, Figure 1, further illustrating the aforesaid clutch and also illustrating the intercontrol connection to the clutch operating means.

Figure 4 is a sectional view taken on line 4—4, Figure 1, illustrating the sectional nut and its operating means for connecting the carriage or apron to the feed screw, and also illustrating the intercontrol connection to these operating means for the nut.

Figure 5 is a sectional view taken on line 5—5, Figure 4, for detailing the half nut operating element.

Figure 7 is a sectional view taken on line 7—7, Figure 3, illustrating the relation of the stationary guide screw and the groove which cooperate for shifting the clutch of the intercontrol.

Figure 6:
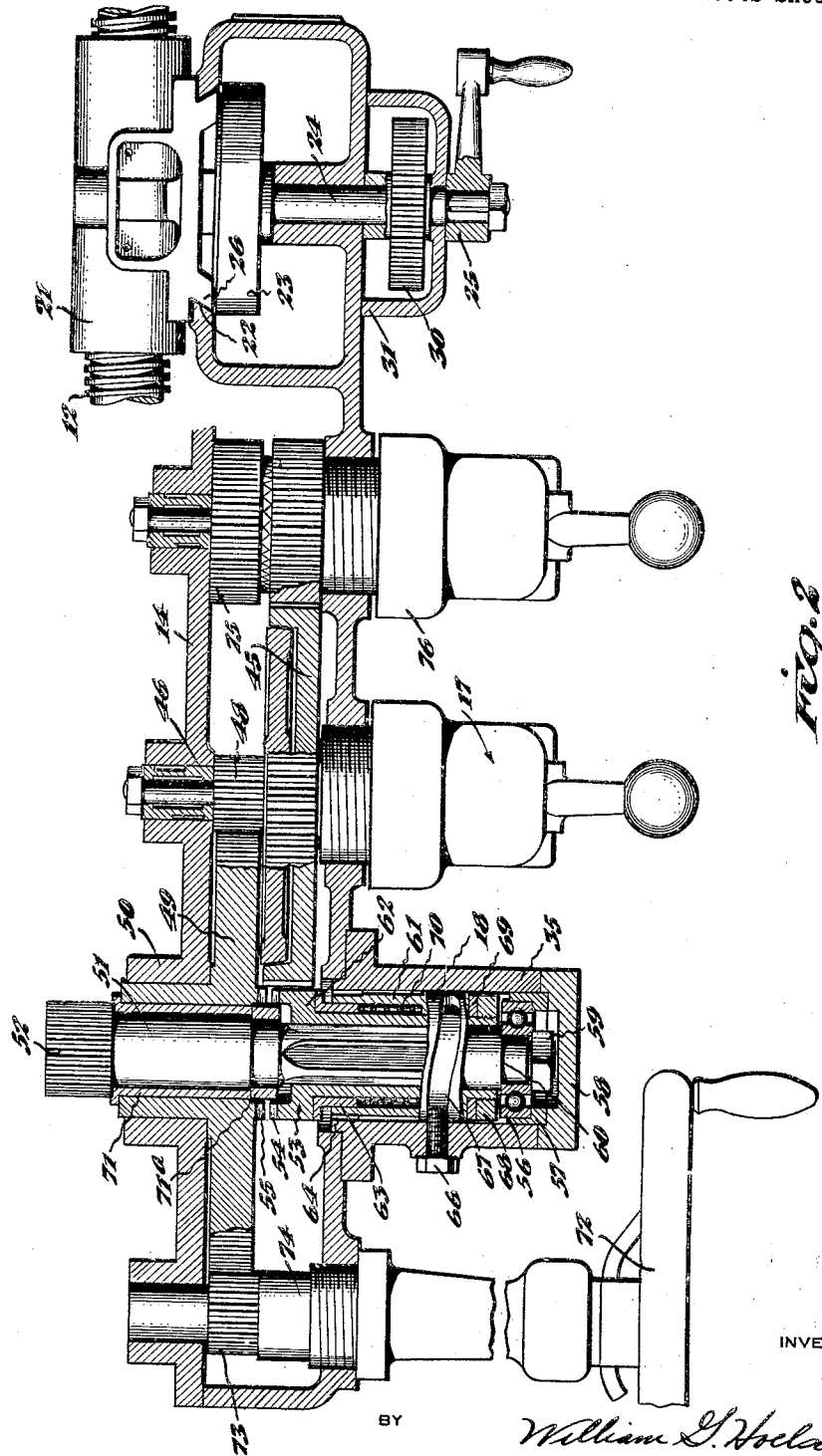
Figure 6 is a fragmentary view of the sectional nut showing it moved into engagement with the screw for accomplishing the carriage drive.

Referring specifically to the drawings, the lathe body is indicated at 10 and includes the conventional longitudinal guideways 11 for slidably mounting the carriage 9. The source of power for the various transmissions which the present invention controls is not disclosed in view of the fact that it may be of any conventional form.

For the purpose of this description, the feed screw 12 is shown disposed at the side of the lathe bed and the power shaft 13 is disclosed disposed beneath and in parallelism with the feed screw. The feed screw and the power shaft traverse the lathe apron 14 which is attached to the underside of the carriage and depends below the surface of the ways 11 at one side thereof.

The lathe apron contains the various levers and clutches for alternately using the rapid traverse, afforded by the connection to the main power shaft, or the feed shaft. As described, two transmissions are included: one provided by engagement of a nut 15 with the feed screw 12 and the other provided through a train of gears 16 extending from the feed shaft through a main clutch 17 and an intercontrol clutch 18 to the rack 19 disposed on the underside of the lathe bed.

An intercontrol connection 20 is provided between the coupling means for these respective carriage feed means, whereby as stated it is impossible to connect both concurrently.

The nut 15 is sectional and the elements 21 thereof are adapted to engage with the feed screw from opposite sides. For this purpose the elements of the nut are vertically slidably mounted in ways 22 in the rear face of the apron. The sections or elements 21 are brought together by means of a cam 23 and mounted on a control shaft 24 mounted in and extending to the front of the apron and there carrying a manually operated control lever 25. The sections of the nut each include dovetailed guide portions 26 mounted in the guideways 22 formed in the apron and each constitutes a half nut. These sections are supported by the cam and have operative connection therewith by means of pins 27 secured in the sections by set-screws 28, these pins extending into respective cam grooves 29 formed in the cam.

Observing Figure 5, it will be noted that these cam grooves are eccentric to the axis of the cam and are substantially 90° in length. The ends of the grooves which are nearest the axis of the cam are adapted to be in engagement with the pins when the sections of the nut are engaged about the screw. As the cam is rotated by means of the control lever, the pins are moved outwardly from the center of the cam through the eccentric grooves and the sections of the nut are moved vertically until entirely clear of the feed screw.

Figure 6 illustrates the cam effecting the engaged position of the nut. The shaft 24, which carries the cam and the operating lever, also carries a gear 30 which is an element of the means for extending the control from the common shaft and lever to the intercontrol clutch in the transmission which connects the power shaft to the rack on the underside of the lathe bed. The gear 30 is fixed to the cam shaft on the outer face of the main body of the apron and is enclosed in a transmission housing 31 attached to the front face of the apron.

Another gear 32 is in mesh with the gear on the shaft, this gear being mounted on a stub shaft 33 secured in the walls of the transmission casing and engaging the teeth of a slidably mounted rod 34 of the intercontrol. The rod is slidably mounted in a bore formed in the transmission casing 31 at that particular end and has its other end slidably mounted in a transmission or clutch housing 35 which supports the clutch 18 for connecting the feed shaft to the rack.

Since the transmission to the toothed rod of the intercontrol is a direct connection from the nut operating shaft it is operated whenever the nut is moved into or out of engagement with the feed screw. This rod connects directly to the operating parts of the clutch 18 which is mounted at an intermediate point in the gearing extending from the feed shaft to the rack. The feed shaft extends through the apron and carries a gear sleeve 36 in splined connection thereon. The sleeve has bevel gears 37, 37 formed at its respective ends. The sleeve is shiftable along the feed shaft for the purpose of alternately engaging the bevel gears with a large bevel gear 38 mounted in the apron intermediate said bevel gears of the sleeve.

The shifting of the sleeve is accomplished by means of a control lever 39 attached to the outer end of a rock shaft 40 which shaft carries an arm 41 at its inner end including a pin 42 carrying a shoe 42ª engaged in an annular groove 43 in the sleeve. The control lever has three positions for moving the sleeve, which are for reverse directions and neutral respectively.

The shaft mounting the large bevel gear also carries a pinion gear 44 which is in mesh with a large gear 45 loosely mounted on a shaft 46 in the apron. The conventional cone clutch 17 is included on this shaft for connecting or disconnecting the transmission, for drive to the carriage through the feed shaft and rack when the intercontrol clutch is in and the feed screw connection is not being used. The clutch 17 when actuated to disconnect the drive concurrently with the connection of the intercontrol clutch provides neutral position for the carriage feeds. The clutch is of the cone type and connects the large gear 45 with a pinion gear 48 which is in mesh with a large gear 49 loosely mounted within a boss 50 of the apron. This large gear is connected to an axially disposed pinion shaft by means of the intercontrol clutch actuated through the previously described rod.

The intercontrol clutch 18 is inserted in the transmission at this point for ultimately controlling the drive from the power shaft. The clutch is operative for connecting the loosely mounted gear to the axially mounted shaft 51 which carries a pinion 52 at its inner end in engagement with the rack 19 of the lathe body. The operation of the clutch is effective for disconnecting the loosely mounted gear from the pinion shaft when the main control lever has been operated to bring the half sections of the nut into engagement with the feed screw.

The shaft 51 which is disposed through the loosely mounted gear, is supported at its forward end in the casing 35 bolted to the front face of the apron. A slidably mounted clutch element 53 is in splined connection with the forward end of the shaft. This clutch element includes clutch teeth 54 on its inner end engageable upon translatable movement with clutch teeth 55 on the forward face of the loosely mounted large gear. The shaft is mounted at its forward end in a ball bearing 56 mounted within a sleeve 57 within the transmission casing. A suitable cap 58 covers the outer end of the casing. The shaft is counterbored to receive the ball bearing and a nut 59 engages the inner race of the ball bearing against the shoulder 60 provided by the counterturning for securing the shaft against longitudinal displacement. The clutch element is shifted by means of a sleeve cam 61 loosely rotatively mounted about the clutch element. The clutch element includes a headed inner end 62 and the shiftable clutch element is mounted on the main body portion thereof. The sleeve cam 61 is supported at its outer end by direct engagement with the clutch element and has a counterbored inner end supported on a bearing sleeve 63 engaged about the clutch element and abutting the head thereof.

The bearing sleeve 63 is fixed to the sleeve cam to prevent relative rotative movement of these parts and to permit longitudinal movement of the sleeve cam on the bearing by means of pins 63ᵃ in the bearing sleeve extending radially therefrom into longitudinal slots 63ᵇ in the sleeve cam. The sleeve cam 61 is rotatively actuated by means of the toothed rod meshing with a pinion gear 65 mounted in the transmission casing and meshing with peripheral teeth 64 formed on the sleeve cam.

The rotative movement imparted to the shiftable element is converted to translative motion by means of a screw 66 adjustably mounted in the wall of the transmission casing and extending radially into the shiftable element within a circumferential groove 67 thereof. The circumferential groove in the surface of the shiftable element is spirally formed for the purpose of longitudinal shifting, as the element is rotated relative to the screw. The outer end of the sleeve cam carries an abutment collar 68 fixed thereto. A thrust washer 69 is engaged against the inner face of the collar and is adapted to be abutted by the outer face of the sleeve cam. The peripheral teeth in the shiftable element are relatively long for permitting the necessary lateral shifting relative to the pinion. The intercontrol coupling or clutch, as shown in Figures 2 and 6 is disconnected as the shiftable element is rotated in a clockwise direction at the time when the nut is engaged with the screw.

A coil spring 70 is interposed in the counterbore of the shiftable element and against the journal sleeve 63 mounted between the shiftable element and the coupling element. As translation of the shiftable element takes place, this translative motion is transmitted to the shiftable element for translation thereof through the medium of the spring. When tooth to tooth engagement occurs, the spring will compress permitting full shifting of the operating lever and will thereafter be effective for forcing the teeth into proper mesh (see Figure 3).

When the clutch retractive movement takes place, the outward movement of the shiftable element is accomplished by the engagement of the actuated cam sleeve element with the thrust washer and the collar at the forward end of the clutch element accomplishing the unitary retractive connection between the clutch element and the sleeve cam. The shaft 51 is loosely rotatively mounted within the large gear within a fixed bearing sleeve 71 and held against longitudinal movement by the abutment of the pinion 52 and a collar 71ᵃ with the respective ends of the fixed sleeve 71.

A hand wheel 72 is provided, mounted in the apron adjacent the large gear, including a pinion gear 73 on its shaft 74 in engagement with the large gear driven from the bevelled gear shaft.

A train of gears 75 is utilized and a clutch 76 is interposed for the purpose of controlling the operation of the cross slide without being effected by the operation of the intercontrol clutch.

The transmission from the power shaft to the rack is positively and automatically connected or disconnected depending on the position of the half nut and any manipulation of the clutch control lever in the feed transmission to the rack is ineffective when the intercontrolled clutch is disconnected. It, therefore, can not occur that both types of feed are connected concurrently. Moreover, the automatic operation of the intercontrolled clutch is accomplished through the same lever which connects the nut to the feed screw.

The intercontrol clutch is located in the transmission for the purpose of disconnecting the pinion shaft 51, which has its pinion 52 in engagement with the rack, from the rest of the transmission with the result that the only part which receives back rotation as the carriage is moved relative to the rack, at those times when screw feed is being used, is the pinion shaft. The effect of this is to also disconnect the hand wheel from back drive and thereby eliminate the possibility of injury to the workman at this time.

Having described our invention, we claim:

1. In a device of the class described; a lathe body, a carriage slidably mounted on the lathe body, a feed screw, a power shaft, a nut mounted in the carriage and engageable with said feed screw, means for operating said nut, a rack on the lathe body, a transmission extending from the power shaft to the rack, a clutch in said transmission, means for shifting said clutch including a rotatable element for operating the clutch, said element having a gear formed thereon, a rod having a toothed end in engagement with the gear portion of said rotatable element and the opposite end connected to the nut operating means, and a manual control lever for translating said rod to accomplish alternate carriage feeds through the nut or the clutch.

2. In a transmission for lathes for moving the carriage on the bed, a feed screw, a drive shaft, a nut mounted in the carriage and adapted to engage the feed screw, a rack mounted on the lathe bed, a transmission extending from the drive shaft to the rack, a control lever for shifting the nut into engagement with the feed screw, an intercontrol clutch included in the transmission extending from the drive shaft to the rack, an interconnection between the nut shifting lever and the intercontrol clutch for alternately moving the carriage through the respective feeds, and a second clutch in the transmission between the intercontrol clutch and the drive shaft.

3. In a transmission for feeding the carriage of a lathe, a screw, a power shaft, a nut mounted in the carriage and engageable with said screw, control means for operating the nut, a rack mounted on the lathe body, a transmission extending from the power shaft and including a pinion meshing with the rack, a clutch located adjacent the rack pinion and adapted to disconnect the pinion from the remainder of the transmission, and an intercontrol lever operative between the nut control means and the clutch for shifting the clutch.

4. In a transmission for feeding the carriage of a lathe, a screw shaft, a power shaft, a nut mounted in the carriage and engageable with said screw shaft, a lever and operative connection for shifting said nut, a rack mounted on the lathe body, a transmission extending from the power shaft to the rack, a clutch in said transmission adapted to disconnect the transmission from the rack with the exception of the element directly engaging the rack, a shifting connection between the nut operating lever and the clutch for controlling the clutch, and a handwheel for operating the transmission, said handwheel disconnected from the rack by means of said clutch.

5. In a device of the class described; a lathe body, a carriage slidably mounted on the lathe body, a feed screw, a power shaft, a nut mounted in the carriage and engageable with said feed screw, lever means for operating said nut, a rack on the lathe body, a transmission extending from the power shaft to the rack, a clutch in said transmission, means for shifting said clutch including a rotatable cam sleeve including a spiral groove in its periphery and a gear portion, a stationary element engaged in said groove, a rod having a toothed end in engagement with said gear portion of said rotatable cam sleeve and an opposite toothed end, a gear mounted on said lever means and engaged by said opposite toothed end of the rod, and a manual control lever for translating said rod to accomplish carriage feed through the clutch or the nut.

6. In a device of the class described, a lathe body, a carriage slidably mounted on the lathe body, a feed screw, a nut mounted in the carriage for engagement with said feed screw, means for operating said nut, a rack on the lathe body, a power driven transmission extending to the rack, a clutch in said transmission, an operating gear in said clutch, a rod having a toothed end in engagement with the operating gear of said clutch and having its opposite end connected to the nut operating means, and a control lever for translating said rod to accomplish carriage feed either through the nut or through the clutch.

In witness whereof, we hereunto subscribe our names.

WILLIAM G. HOELSCHER.
ALBERT E. ROBINSON.